Sept. 11, 1962 G. R. KERN, JR 3,053,503
FLUID DRILL
Filed March 7, 1960 2 Sheets-Sheet 1

INVENTOR
GEORGE R. KERN, JR.

BY Beale & Jones
ATTORNEYS

Sept. 11, 1962  G. R. KERN, JR  3,053,503
FLUID DRILL
Filed March 7, 1960  2 Sheets-Sheet 2
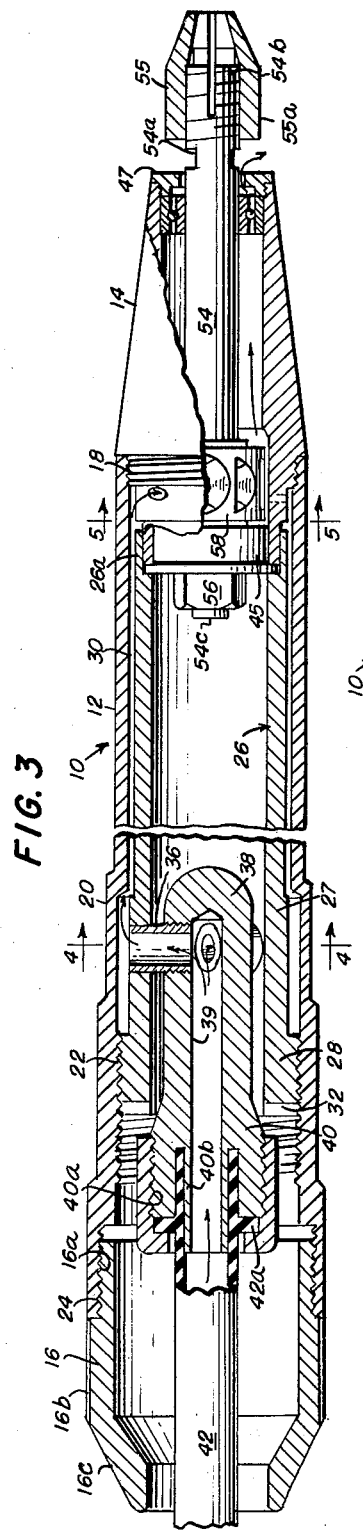
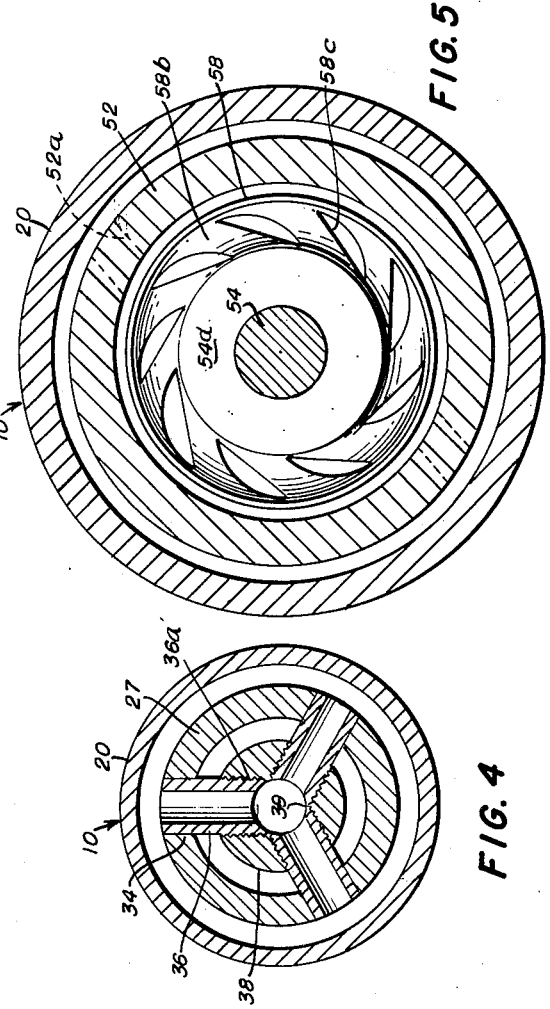
INVENTOR
GEORGE R. KERN, JR.
BY *Blake & Jones*
ATTORNEYS United States Patent Office 3,053,503
Patented Sept. 11, 1962

1

3,053,503
FLUID DRILL
George R. Kern, Jr., Herndon, Va., assignor to Fairfax Manufacturing Company, Inc., Falls Church, Va., a corporation of Virginia
Filed Mar. 7, 1960, Ser. No. 13,177
6 Claims. (Cl. 253—2)

This invention relates to improvements in a relatively small hand drill for various uses that is fluid pressure driven. This application is a continuation-in-part application of my copending application Serial Number 859,270, filed December 14, 1959, now abandoned.

An object of the invention is to provide an industrial type of hand drill that is of elongated slender shape for grasping in the hand and for manipulation by the fingers with fluid pressure motor drive for a shaft projecting from the front thereof which has attached a chuck.

Another object is to provide improvements in the fluid pressure elongated drill of this type having fluid pressure supplied at the rear end and passed between outer and inner tubular sleeves forwardly through the drill to an annular distribution reservoir where orifices conduct the fluid to drive a fluid rotor that exhausts ultimately mainly rearwardly through the inner tubular sleeve.

A further object of the invention is to provide a small size drill that can be handled by the fingers of the operator yet will withstand both high side pressure and thrust forces when pressure is applied to the drill shaft.

Yet another object of the invention is to provide in a light weight elongated hand type of drill a short coupled drill shaft in the forward end supported by a nose and a rear bearing and having a fluid drive motor mounted on the shaft just forward of the rear bearing.

A still further object of the invention is to provide in a small sized hand drill of the relatively small elongated type a fluid pressure driven motor having rotor crescent shaped bucket openings formed in spaced apart relation about the periphery for drive from orifices arranged in spaced relation in the drill casing about the rotor and with the rotor having apertures connecting the ends of said bucket openings and the respective front and rear faces of the rotor for condensing entrapped lubricating oil mist in the fluid pressure supply for lubricating the bearings.

Yet a still further object of the invention is to provide in a relatively small size of elongated hand drill a mounting for a thrust bearing in an inner casing member with a cooperating rear skirt portion of a nose member received in the inner casing member and holding the thrust bearing, said nose member having a rear annular portion adjacent the skirt portion with jet orifices formed therein and with the annular portion carrying the orifices mounted in spaced relation within the forward end of an outer casing.

Still further objects and the entire scope of applicability of the present invention will become apparent from the detailed description given hereinafter. It should be understood, however, that the detailed description and specific examples are given by way of illustration only and, while indicating preferred embodiments of the invention, is not given by way of limitation, since various changes and modifications within the spirit and scope of the invention will become apparent to those skilled in the art from this detailed description.

For a more complete understanding of the nature and scope of this invention reference may be had to the drawing in which.

2

Figure 1:
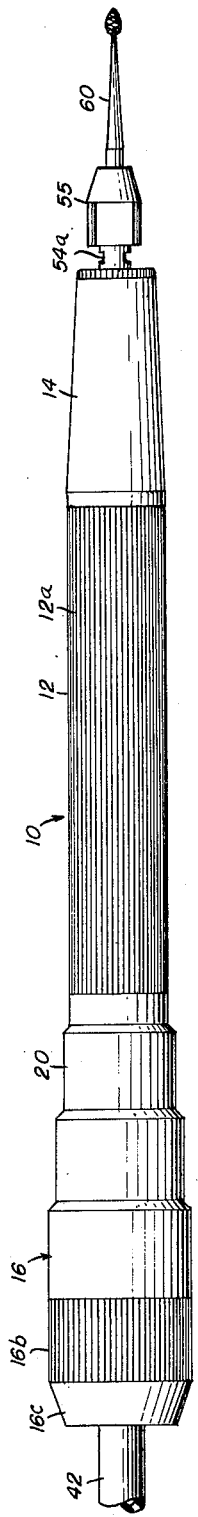
FIG. 1 is an elevational view of the drill.

FIG. 3 is a vertical longitudinal section on a slightly enlarged scale over that of FIG. 1 of the drill;

FIG. 4 is a cross section on line 4—4 of FIG. 3 on an enlarged scale; and

FIG. 5 is a cross section on line 5—5 of FIG. 3 on a still further enlarged scale to show the end apertures in the rear end of the rotor of the fluid motor.

Throughout the description like reference numbers refer to similar parts.

A drill of small size of approximately a six inch overall length and a little over one-half inch diameter at the hand grasp portion is indicated at 10 in FIG. 1 and is of the fluid pressure driven type which may be easily held and manipulated in the hands of the operator. This drill 10 though small is rugged and is of the industrial type and adaptable for many different uses.

The drill 10, see FIG. 1, comprises in general a centrally disposed outer tubular housing 12, a nose member 14 and a tail piece 16. The outer tubular housing 12 has an internally threaded front end 18 and an increasing diameter stepped rear portion 20 with internally threaded portion 22 on the intermediate step and an interiorly threaded rear portion 24. Housed within the elongated tubular outer housing 12 is an inner tubular housing 26 which has an increasing diameter stepped rear portion 27 corresponding to the stepped portion 20 on the surrounding outer housing member 12 in general extent and a rear exteriorly threaded portion 28 threadedly received within the interiorly threaded portion 22 of the exterior housing and of about half the length of that threaded portion 22. This inner sleeve 26 is closely spaced within the outer housing 12 and forms therewith an elongated annular fluid pressure passage generally indicated at 30. The rear threaded portion 28 of the inner housing 26 is formed with a wrench receiving slot 32 extending across its diameter while its front end 26a having a shouldered recess 26b therein terminates in spaced relation within the front threaded end 18 of the outer housing 12.

Reference to FIG. 4 shows that the stepped portion 27 of the inner housing 26 is formed with three equally spaced apart radially extending apertures 34 which have soldered therein short nipples 36 which are threaded at their inner ends 36a and are received within an axially extending hollow connector 38 which is closed at its front end, see FIG. 3, and extends rearwardly within the rear end of the inner tubular housing 26 and the outer tubular housing 12. Axially extending connector 38 has an axial passage 39 extending to the rear where its rear end is enlarged at 40 and has external threads 40a and an annular recess 40b formed therein which receives a flexible tubular conduit 42 having a flanged portion 42a with the front end of 42 received in the slotted portion 40b by means of a clamping nut 44 internally threaded and received over the threads 40a so that the nut rides against the tubular member 42 and its flanged portion 42a to clamp them in tight connection with the connector 38. Fluid pressure applied to the conduit 42 from an exterior source flows forward through the axial aperture 39 then radially through the nipples 36 into the annular elongated passage 30 formed between the exterior housing member 12 and the interior housing member 26.

The tail piece 16 is exteriorly threaded at its front end at 16a where it is reduced in diameter, and is received within the interiorly threaded rear end portion 24 of the outer sleeve 12. Tail piece 16 has knurling 16b on its exterior surface to assist in its assembly while its extreme rear portion at 16c tapers inwardly and rearwardly and surrounds and guards the flexible conduit 42 in spaced relation therewithin. The exterior middle portion 12a of the outer housing 12 is knurled as is the tail piece 16 at knurled portion 16b. Thus the drill 10 may be easily held in the hand and manipulated with the fingers and thumb.

Received in the forward recessed end 26b of the inner elongated tubular housing 26 in the radial flange 45a of an antifriction thrust or rear bearing 45 which seats against a rear shoulder 26c at the rear of the recess 26b.

The nose member 14 is tapered and hollow and has a specially formed rear end which will be described. The forward end of the nose member 14 receives a front antifriction bearing 46 that is held in place by a cap 47 having a reduced external threaded rear end 47a and a shoulder 47b that seats against the front end of nose 14 while the threaded portion 47a is received in an internally threaded portion 48 of nose 14. The nose member 14 will be further described.

The rear end portion of nose member 14 is formed with annular stepped portions. The tapered portion 49 terminates in a cylindrical rear portion 50 having to the rear thereof a reduced annular externally threaded portion 51 with a vertical shoulder portion 50a just forward of the threaded portion to abut the forward end of the outer casing 12 when the threaded portion 15 of the nose is received in the internally threaded forward end 18. To the rear and adjacent the threaded portion 51 of the nose 14 is a reduced in diameter annular collar portion 52 having jet orifice passages 52a extending therethrough with the annular collar portion 52 spaced in from the surrounding outer housing member 12. It will be noted that the annular space between the collar 52 and the housing 12 is in direct communication with the annular fluid pressure passage 30 whereby fluid pressure is supplied to the jet orifices 52a. To the rear of the annular collar 52 the nose member 14 is formed with a reduced in diameter annular sleeve 53 which is received in the recessed portion 26b at the forward end of the inner tubular housing 26 and in such manner that the rear end of the annular sleeve 53 at 53a abuts the flange 45a of the thrust bearing 45 to hold it in place.

Extending within the nose member 14 and supported in the bearings 45 and 46 is a drill shaft 54 whose front end has a formed wrench receiving portion 54a and adjacent it at the forward end a bifurcated threaded end 54b that is tapered at its forward end and receives a chuck collar 55 having an externally knurled portion 55a as is well known. The rear end of the shaft 54 extends through the thrust bearing 45 and is externally threaded at 54c to receive a securing nut 56. Shaft 54 has formed thereon a radially extending thrust collar portion 54d that extends from its forward end which is generally radially in line with the cylindrical portion 50 of the nose to abut against the thrust bearing 45 at its rear end.

Mounted on the cylindrical collar portion 54d of the drill shaft 54 and fixedly secured thereto as by soldering is a rotor member 58 of a fluid drive turbine motor. The rotor 58 is of annular shape and is formed with a plurality of peripherally spaced apart crescent shaped cut outs to form fluid pressure bucket portions 58a therein to receive the thrust from the jets of fluid pressure from the orifices 52a. The pressure impinges against the buckets 58a and partially exhausts after passing the nozzles to pass partially forward but to a greater extent to the rear where it passes between the inner and outer races of the bearing 45, thence on further to the rear through the elongated inner housing 26, about the connector 38 and the flexible conduit 42 and within the tail piece 16.

Figure 2:
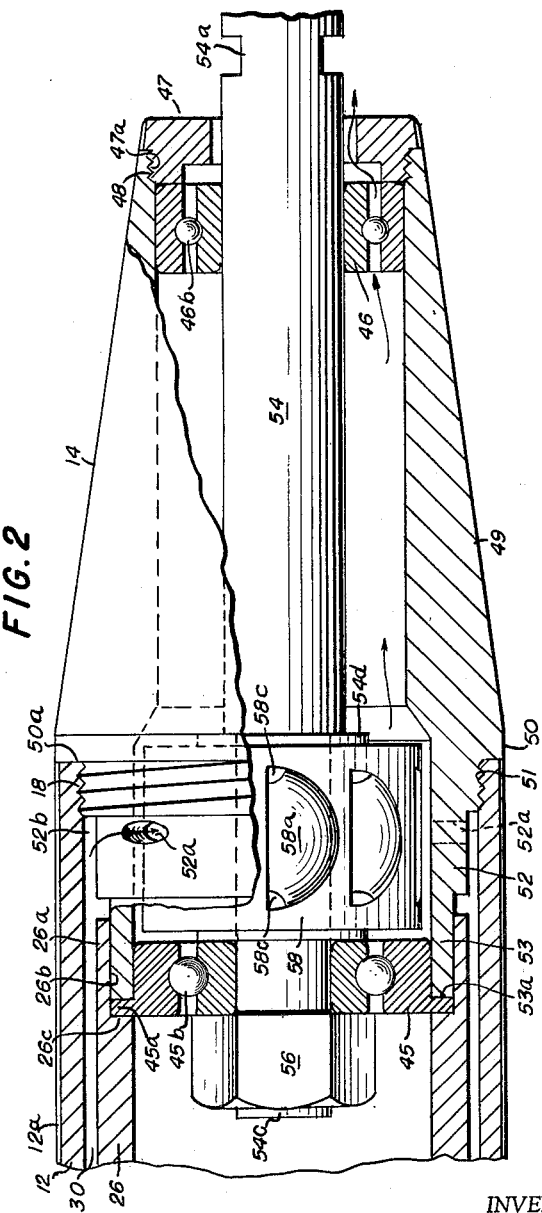
FIG. 2 is a fragmentary section of the forward portion on an enlarged scale showing the nose member, the drill shaft with its bearings and the fluid pressure motor.

In the construction of the annular rotor 58, each end is machined out or formed with a recess 58b, see FIG. 5, adjacent the ends of the bucket portions 58a. These recesses 58b are generally concave in cross section as they are cut into or formed in the ends of the rotor 58. The bottom of these recesses 58b are deep enough to meet up with the ends of the crescent shaped buckets 58a as indicated at 58c and as best shown in FIGURES 2 and 5. These end apertures 58c serve to conduct a portion of the exhaust fluid from the buckets 58a and to condense some of the oil carried as mist in the fluid pressure supply whereby the condensed mist of oil serves to lubricate the moving parts of the antifriction bearings, namely, the ball bearings 45b and 46b in the particular type of antifriction bearings here utilized.

In FIG. 1 it will be observed that a burr or drill 60 is typically received in the chuck.

The drill is of relatively light weight and size yet is rugged in construction. It can have a heavy thrust applied in the longitudinal axial direction of the drill and it will be taken up by the thrust bearing 45. So also the drill may have side pressure applied thereto and it is taken up in the relatively short couple of spaced apart antifriction bearings 45 and 46. The bucket type of rotor and its arrangement on the drill shaft 54 affords high torque conversion of energy from the fluid pressure supply applied through the jet orifices 52a. The interior of the inner elongated housing 26 forms an enlarged chamber for further expansion of the exhaust gas to reduce the back pressure as the exhaust gases exhaust for the most part to the rear. The forward flow of the fluid under pressure through the annular passage 30 affords a direct application of the fluid pressure to the orifices 52a without reduction or restriction of the pressure as a relatively large annular pressure supply chamber 52b is provided about the orifices which adds directly to the relatively large annular pressure supply reservoir formed by the annular passage 30.

The drill is easy to assemble and to disassemble for repairs yet is streamlined and of rugged construction affording high torque for a relatively small size of industrial hand held drill.

I claim as my invention:

1. A drill comprising, in combination, an elongated outer tubular housing having a rear end and a forward end, said ends being internally threaded, an inner tubular housing externally threaded at its rear end and threadedly received in the internally threaded rear end of the outer housing, said inner tubular housing being annularly spaced from the surrounding outer housing thereby leaving an annular elongated passage therebetween, said inner tubular housing having its forward end terminating in spaced relation from and within the forward threaded end of the outer tubular housing and having an annular bearing receiving recess therein, said inner tubular housing having at least one fluid pressure supply aperture extending generally radially through the wall thereof adjacent its threaded rear end for supplying fluid pressure to said elongated annular passage, said passage serving as a fluid pressure conducting means for supplying power to rotate the drill, conduit means connecting with said aperture in the inner tubular housing and extending to the rear of said inner and outer tubular housings and in spaced relation within said surrounding inner tubular housing to form an exhaust passageway, a thrust bearing seated in the annular bearing receiving recess in the forward end of said inner tubular housing, a nose member lying in axial alignment with the elongated outer and inner tubular housings and having an annular rear end with a portion thereof externally threaded and an internally threaded forward end, said annular rear portion of the nose member being received in the front end of said outer tubular housing in annular spaced relation thereto, the rear end of the nose member abutting against said thrust bearing and having its externally threaded portion received in said internally threaded forward end of the outer housing, said annular rear portion of the nose member having jet orifices extending therethrough and communicating with said elongated annular passage, a forward bearing received in the forward end of said nose member, an annular externally threaded securing collar received in the threaded forward end of the nose member and holding the forward bearing therein, a drill shaft received in and extending through said bearings and having chuck means on the forward end thereof and securing means on the rear end of the drill shaft abutting against the rear end of said thrust bearing, said drill shaft extending in relatively short couple between its supporting bearings whereby high transverse thrusts are accommodated for sustained sidewise cutting with said drill, and an annular turbine rotor fixed to said drill shaft adjacent the thrust bearing and within the surrounding jet orificed portion of said nose member, said annular rotor having spaced apart fluid pressure receiving bucket portions therein in the circular periphery thereof and in line with said jet orifices positioned in the rear end of the nose member, whereby fluid pressure is supplied to said jet orifices from said annular passageway and the major portion of exhaust fluid from said turbine rotor escapes to the rear through said inner housing member.

2. A drill according to claim 1 wherein said turbine rotor has vent passages extending therein from the bucket portions to each end of the rotor whereby exhausting drive fluid from said turbine rotor escapes partially through said vents and travels forwardly and rearwardly to lubricate said thrust bearing and said forward bearing.

3. A drill comprising, in combination, an elongated outer tubular housing having a rear end and a forward end, said forward end having connecting means for receiving the rear end of a nose member, an inner elongated tubular housing having connecting means at its rear end for connecting with the surrounding rear end portion of the outer housing, said inner tubular housing being annularly spaced from the surrounding outer housing thereby providing an annular elongated fluid pressure passage therebetween, said passage serving as a fluid pressure conducting means for supplying power to rotate the drill, said inner tubular housing having its forward end terminating in spaced relation from and within the forward end of the outer tubular housing and having a recess therein for receiving a thrust bearing therein said inner tubular housing having at least one fluid pressure supply aperture extending through the wall thereof adjacent its rear end for supplying fluid pressure therethrough to said elongated annular passage, conduit means connecting with said aperture in the inner tubular housing and extending to the rear through said inner and outer tubular housings and in spaced relation within said inner tubular housing to form an exhaust passageway, a thrust bearing received in the thrust bearing recess in the forward end of said inner housing and having a radial flange thereon received in said bearing receiving recess in the inner housing, a hollow elongated nose member lying in axial alignment with the elongated outer and inner tubular housings and having an annular rear end with a portion thereof having connecting means thereon and a forward end with bearing receiving means therein, said annular rear portion of the nose member having its connecting means connecting with said nose connecting means on the forward end of the outer housing, said rear end of the nose member having an annular portion thereon to the rear of the connecting means extending in annular spaced relation to the adjacent surrounding outer housing and forming a pressure reservoir space therewith that is in direct communication with said fluid pressure passage, the extreme rear end portion of the nose member being of reduced diameter and of annular configuration and received in the bearing recess with the extreme rear portion of the nose member abutting against said flange on the thrust bearing, said annular rear portion of the nose member adjacent said securing means having at least one orifice extending therethrough, a forward bearing received in the bearing receiving means in the forward end of said nose member, annular means securing said forward bearing in the nose member, a drill shaft received in and extending through said bearings and having chuck means on the forward end thereof and means on said shaft for holding said shaft in said bearings, said shaft having an enlarged annular thrust portion thereon adjacent said thrust bearing for thrust action thereagainst, and an annular turbine rotor fixed to said annular thrust portion on the shaft and within the surrounding orifice portion of said nose member, said drill shaft extending in relatively short couple between its supporting bearings whereby high transverse thrusts are accommodated for sustained sidewise cutting with said drill, said annular rotor having peripheral spaced apart fluid pressure receiving vane means thereon in line with said orifice, whereby fluid pressure is supplied to said orifice from said annular passage and pressure supply reservoir and the major portion of exhaust fluid from said turbine rotor escapes to the rear through said inner housing member.

4. A drill according to claim 3 wherein said pressure vane means in the turbine rotor are spaced apart indented buckets formed therein and end of said rotor has an annular concave in cross section cut out portion whereby the bottom of the cut out end portion communicates with the adjacent ends of the indented buckets to form exhaust pressure fluid bleed off passages at each end of the rotor.

5. An elongated drill according to claim 3 wherein said front bearing and thrust bearing are spaced apart about one third the length of said elongated drill to form a short couple bearing support to receive the drill shaft therein and wherein said drill shaft is of a length about one third the length of said elongated drill whereby said drill withstands sustained forces transverse to the length of said drill for making sidewise cuts.

6. An elongated drill according to claim 4 wherein said annular securing means for the front bearing is annularly spaced from the drill shaft extending therethrough whereby to provide a vent aperture for exhaust gases that may pass forwardly through said forward bearing.

References Cited in the file of this patent
UNITED STATES PATENTS

| | | |
|---|---|---|
| 2,128,157 | Monnier et al. | Aug. 23, 1938 |
| 2,180,993 | Monnier | Nov. 21, 1939 |
| 2,283,314 | Ckola | May 19, 1942 |
| 2,871,562 | Kern | Feb. 3, 1959 |
| 2,895,738 | Baker | July 21, 1959 |
| 2,897,596 | Maurer | Aug. 4, 1959 |

FOREIGN PATENTS

| | | |
|---|---|---|
| 357,117 | Germany | Oct. 21, 1919 |